United States Patent
Bunch et al.

(10) Patent No.: US 11,251,944 B2
(45) Date of Patent: Feb. 15, 2022

(54) SECURE STORAGE AND USAGE OF CRYPTOGRAPHY KEYS

(71) Applicant: Nutanix, Inc., San Jose, CA (US)

(72) Inventors: Alex Bunch, San Jose, CA (US); Ashok Dwarakinath, San Jose, CA (US); Sunil Agrawal, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 20 days.

(21) Appl. No.: 16/864,152

(22) Filed: Apr. 30, 2020

(65) Prior Publication Data

US 2021/0266149 A1 Aug. 26, 2021

Related U.S. Application Data

(60) Provisional application No. 62/979,452, filed on Feb. 21, 2020.

(51) Int. Cl.
*H04L 9/08* (2006.01)
*G06F 21/62* (2013.01)

(52) U.S. Cl.
CPC .............. *H04L 9/085* (2013.01); *G06F 21/62* (2013.01); *H04L 9/0822* (2013.01); *H04L 9/0894* (2013.01)

(58) Field of Classification Search
CPC ..... H04L 9/085; H04L 9/0822; H04L 9/0894; G06F 21/62

(Continued)

(56) References Cited

U.S. PATENT DOCUMENTS

| 7,272,231 B2 | 9/2007 | Jonas et al. |
| 8,457,317 B2 | 6/2013 | Shaw |

(Continued)

FOREIGN PATENT DOCUMENTS

| CN | 108365950 A | 8/2018 |
| EP | 1532783 A1 | 5/2005 |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Kambiz Zand
*Assistant Examiner* — Phuc Pham
(74) *Attorney, Agent, or Firm* — IPhorizons PLLC; Narendra Reddy Thappeta

(57) ABSTRACT

According to an aspect, a first digital system splits a cryptography key into a first key part (S1) and a second key part (S2), stores S1 in a policy-controlled storage which permits storage according to access policies and stores S2 in a local storage of the first digital system. Upon identifying a requirement in a second digital system for the cryptography key, the first digital system configures for the policy-controlled storage a first policy permitting access of S1 to the second digital system and then sends S2 directly to the second digital system. The second digital system reconstructs the cryptography key by retrieving S1 from the policy-controlled storage based on the first policy and forming the cryptography key from the retrieved S1 and S2 received from the first digital system. Thus, a cryptography key is securely stored and used, without having any single point of attack.

20 Claims, 8 Drawing Sheets

(58) Field of Classification Search
USPC .......................................................... 380/284
See application file for complete search history.

(56) References Cited

U.S. PATENT DOCUMENTS

| | | | |
|---|---|---|---|
| 8,549,518 | B1 | 10/2013 | Aron et al. |
| 8,601,473 | B1 | 12/2013 | Aron et al. |
| 8,850,130 | B1 | 9/2014 | Aron et al. |
| 8,855,318 | B1 | 10/2014 | Patnala et al. |
| 9,094,191 | B2 | 7/2015 | Avanzi et al. |
| 9,461,821 | B1 | 10/2016 | Machani et al. |
| 9,667,416 | B1* | 5/2017 | Machani ................. H04L 63/06 |
| 9,673,975 | B1 | 6/2017 | Machani |
| 9,772,866 | B1 | 9/2017 | Aron et al. |
| 2013/0247230 | A1 | 9/2013 | Parann-Nissany et al. |
| 2019/0238323 | A1* | 8/2019 | Bunch ................... H04L 9/0877 |
| 2019/0288834 | A1* | 9/2019 | Black ..................... H04L 9/0861 |

FOREIGN PATENT DOCUMENTS

| | | |
|---|---|---|
| KR | 20150139304 A | 12/2015 |
| WO | WO2019066822 A1 | 4/2019 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/ pp. all.

Poitras, Steven. "The Nutanix Bible" (Jan. 12, 2016), from https://nutanixbible.com/ pp. all.

Poitras, Steven. "The Nutanix Bible" (Jun. 9, 2016), from https://nutanixbible.com/ pp. all.

Poitras, Steven. "The Nutanix Bible" (Jun. 8, 2017), from https://nutanixbible.com/ pp. all.

Poitras, Steven. "The Nutanix Bible" (Jan. 3, 2017), from https://nutanixbible.com/ pp. all.

Poitras, Steven. "The Nutanix Bible" (Jan. 3, 2018), from https://nutanixbible.com/ pp. all.

Poitras, Steven. "The Nutanix Bible" (Jun. 25, 2018), from https://nutanixbible.com/ pp. all.

Poitras, Steven. "The Nutanix Bible" (Jan. 8, 2019), from https://nutanixbible.com/ pp. all.

Poitras, Steven. "The Nutanix Bible" (Jul. 25, 2019), from https://nutanixbible.com/ pp. all.

Poitras, Steven. "The Nutanix Bible" (Sep. 17, 2019), from https://nutanixbible.com/ pp. all.

Cano, Ignacio et al. "Curator: Self-Managing Storage for Enterprise Clusters"; University of Washington; published Mar. 2017; pp. all.

Seal Unseal—Vault by HashiCorp, https://www.vaultproject.io/docs/concepts/seal.html. downloaded circa Aug. 28, 2020, 01 page.

HP brings simple split-key encryption to the cloud, https://www.theinquirer.net/inquirer/news/2349351/hp-brings-simple-split-key-encryption-to-the-cloud, downloaded circa Oct. 31, 2019, 05 pages.

Secret Key Encryption, https://www.sciencedirect.com/topics/computer-science/secret-key-encryption, downloaded circa Oct. 31, 2019, 16 pages.

* cited by examiner

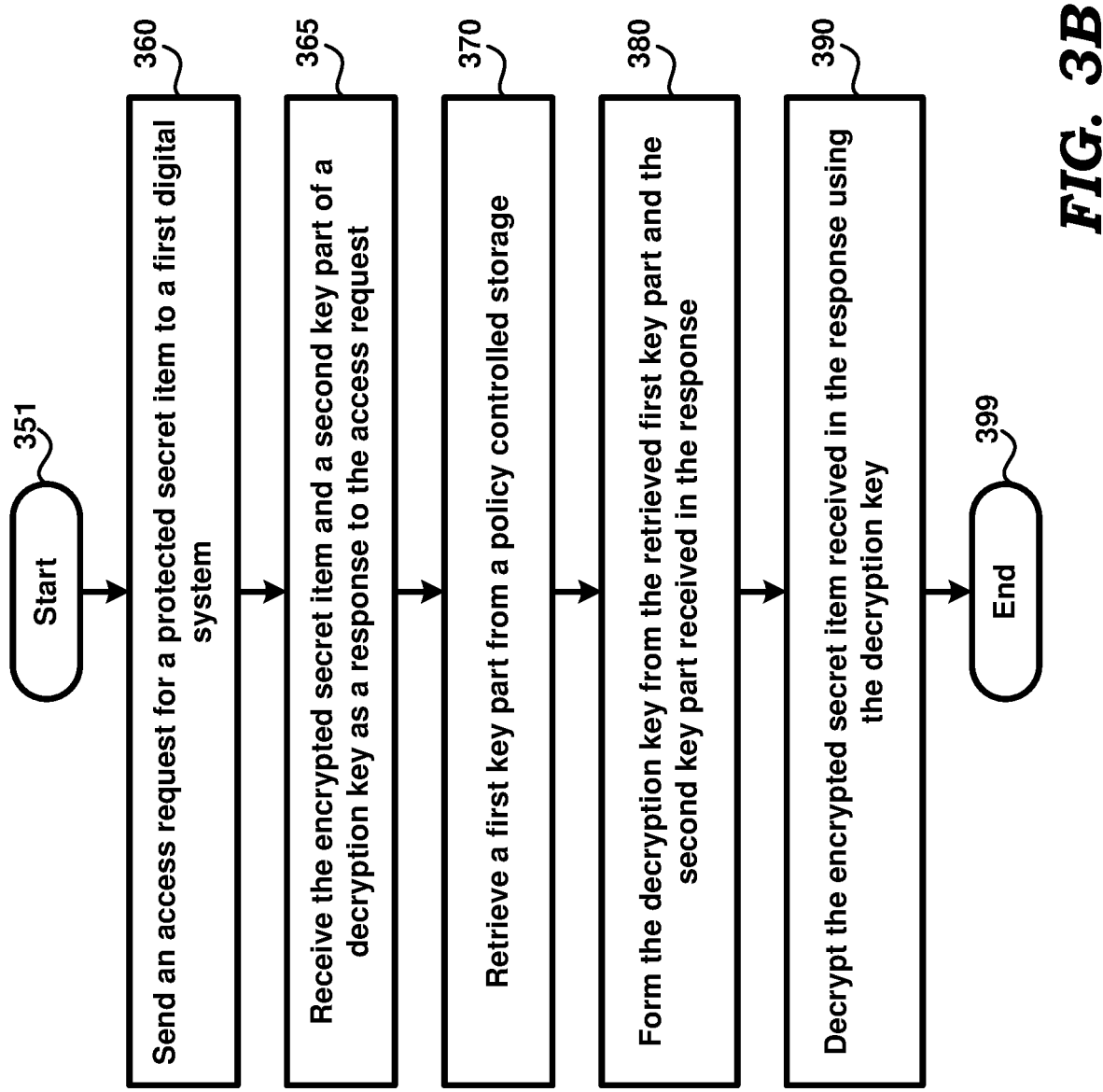

SECURE STORAGE AND USAGE OF CRYPTOGRAPHY KEYS

PRIORITY CLAIM

The instant patent application is related to and claims priority from the US provisional patent application entitled, "SECURE STORAGE AND USAGE OF CRYPTOGRAPHY KEYS", Ser. No. 62/979,452, Filed: 21 Feb. 2020, which is incorporated in its entirety herewith.

BACKGROUND OF THE DISCLOSURE

Technical Field

The present disclosure relates to cryptography systems and more specifically to secure storage and usage of cryptography keys.

Related Art

Cryptography uses keys to encrypt and/or decrypt data items of interest. There is a general need to securely store and use at least some of such keys.

BRIEF DESCRIPTION OF THE DRAWINGS

Example embodiments of the present disclosure will be described with reference to the accompanying drawings briefly described below.

FIG. 3B is a flow chart illustrating the manner in which a protected secret item is accessed in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
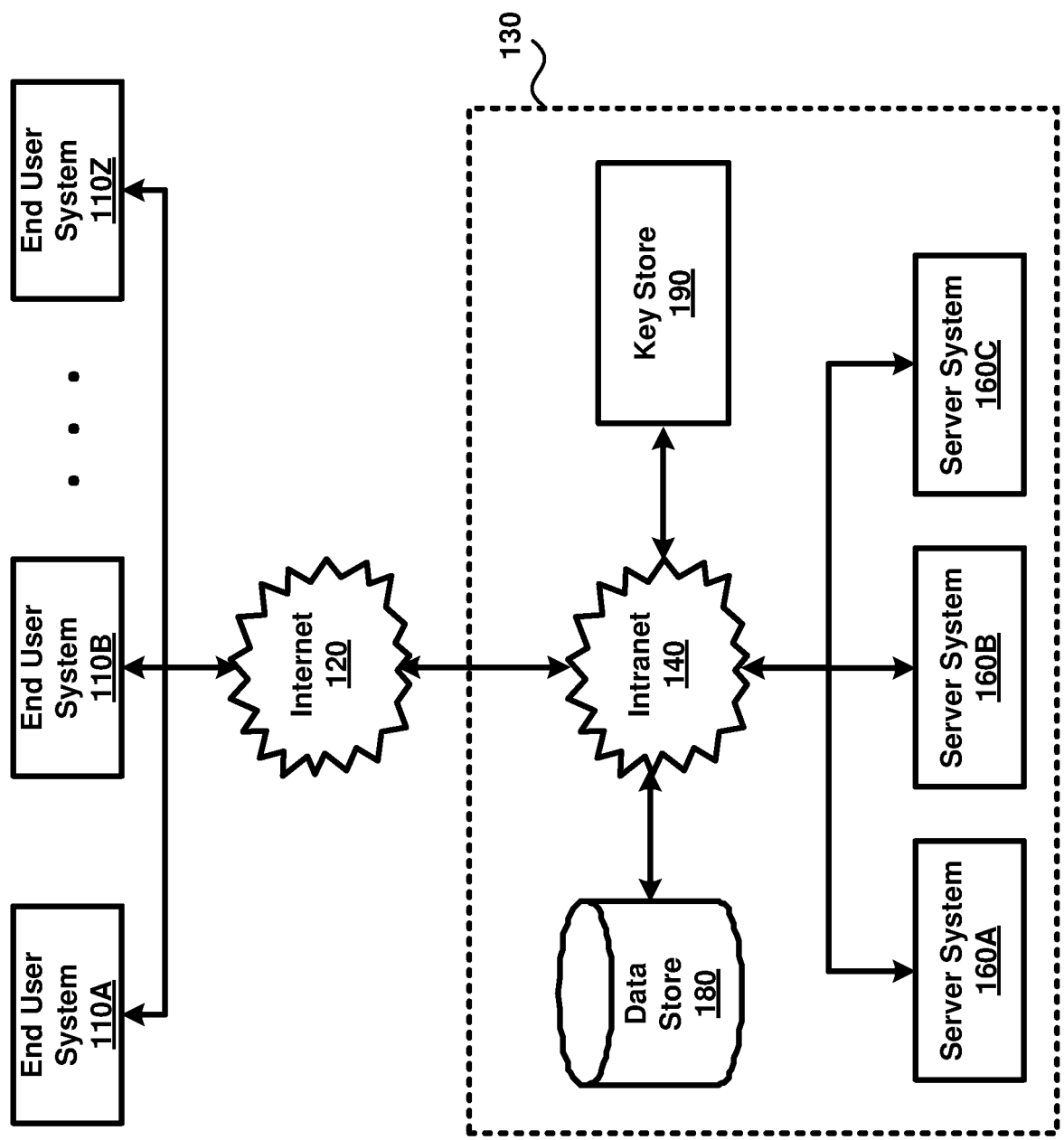
FIG. 1 is a block diagram illustrating an example environment (computing system) in which several aspects of the present invention can be implemented.

An aspect of the present disclosure facilitates secured storage and usage of cryptography keys. In an embodiment, a first digital system splits a cryptography key into a first key part (S1) and a second key part (S2), stores the first key part in a policy-controlled storage which permits storage according to access policies and stores the second key part in a local storage of the first digital system. Upon identifying a requirement in a second digital system for the cryptography key, the first digital system configures for the policy-controlled storage a first policy permitting access of the first key part to the second digital system and then sends the second key part directly to the second digital system. The second digital system reconstructs the cryptography key by retrieving the first key part from the policy-controlled storage based on the first policy and forming the cryptography key from the retrieved first key part and the second key part received from the first digital system. Thus, a cryptography key is securely stored and used, without having any single point of attack.

According to another aspect of the present disclosure, the cryptography key (noted above) is used for protection of a secret item, where the cryptography key is a decryption key used for decrypting an encrypted form of the secret item. The requirement in the second digital system (noted above) is for accessing the secret item.

According to one more aspect of the present disclosure, the first digital system (noted above) generates an encryption key (EK) and the decryption key (DK). The first digital system encrypts the secret item using the encryption key to create the encrypted form of the secret item and stores the encrypted form of the secret item in the local storage of the first digital system. The first digital system then destroys the encryption key and the decryption key. Upon receiving a request to access the secret item from the second digital system, the first digital system sends both of the second key part (S2) and the encrypted form of the secret item as a response to the request. As such, the second digital system reconstructs the decryption key and then decrypts the encrypted form of the secret item received in the response using the reconstructed decryption key.

According to yet another aspect of the present disclosure, the encryption key and the decryption key are the same (for example, by using symmetric encryption approaches).

According to an aspect of the present disclosure, the secret item is another cryptography key protected using the cryptography key (noted above). In one embodiment, another cryptography key is a master key used for protection of other local keys which in turn are used for protection of corresponding data of interest.

According to another aspect of the present disclosure, the first digital system and second digital systems (noted above) are systems of a Remote Office Branch Office (ROBO) cluster.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present disclosure can be implemented. The block diagram is shown containing end user systems 110A-110Z (Z representing any positive integer), Internet 120, intranet 140, server systems 160A-160C (C representing any positive integer), data store 180 and key store 190. The end user systems and server system are collectively referred to by 110 and 160 respectively.

Merely for illustration, only representative number/type of systems is shown in FIG. 1. Many environments often contain many more systems, both in number and type, depending on the purpose for which the environment is designed. Each block of FIG. 1 is described below in further detail.

Intranet 140 represents a network providing connectivity between server systems 160A-160C, data store 180 and key store 190, all provided within an enterprise (as indicated by the dotted boundary 130). Internet 120 extends the connectivity of these (and other systems of the enterprise) with external systems such as end user systems 110A-110Z. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies the target application, the packet may be said to be directed to such application as well.

Data store 180 represents a non-volatile (persistent) storage facilitating storage and retrieval of a collection of data by applications executing in server systems 160A-160C. Data store 180 may be implemented as a database server using relational database technologies and accordingly provide storage and retrieval of data using structured queries such as SQL (Structured Query Language). Alternatively, data store 180 may be implemented as a file server providing storage and retrieval of data in the form of files organized as one or more directories, as is well known in the relevant arts.

Key store 190 facilitates storage and retrieval of keys used for securing access to data items. Keys may be any of cryptography keys (including encryption keys and decryption keys), tokens, passwords, certificates, etc. Key store 190 stores each key securely within an internal data store, with access to the keys being tightly controlled based on policies specified by a user/owner of the keys/data. Each policy specifies the list of clients (users, applications, systems, etc.) that can access (read, write, etc.) the keys. When a client tries to access a key, key store 190 first authenticates the client and if the client is authorized by the policies to access the key, access to the key is granted to the client. Examples of a key store are Vault available from HashiCorp™ and Oracle Key Manager available from Oracle Corporation.

Each of end user systems 110A-110Z represents a system such as a personal computer, workstation, mobile device, computing tablet etc., used by users to generate user requests directed to enterprise applications executing in server system 160A-160C. The user requests may be generated using appropriate user interfaces (e.g., web pages provided by an application executing in server systems, a native user interface provided by a portion of the application downloaded from server systems, etc.).

In general, an end user system requests an enterprise application for performing desired tasks and receives the corresponding responses (e.g., web pages) containing the results of performance of the requested tasks. The web pages/responses may then be presented to the user by user applications such as a browser. Each user request is sent in the form of an IP packet directed to the desired server system, application, with the IP packet including data identifying the desired tasks in the payload portion.

Each of server systems 160A-160C represents a server, such as a web/application server, executing server applications performing tasks requested by users using one of end user systems 110. A server system may use data stored internally (for example, in a non-volatile storage/hard disk within the server system), external data (e.g., maintained in data store 180) and/or data received from external sources (e.g., from the user) in performing the requested tasks. The server system then sends the result of performance of the tasks to the requesting end user system (one of 110A-110Z). The results may be accompanied by specific user interfaces (e.g., web pages) for displaying the results to the requesting user.

During operation, server systems 160 access various data items stored in data store 180. In one embodiment, each server system uses a corresponding cryptography key for communication with data store 180. Thus, the requests and responses (and the data contained thereof) between each server system and data store 180 are protected by the corresponding cryptography key. The different cryptography keys used by different server systems 160 are maintained in key store 190.

It may be readily appreciated that key store 190 is a single point of attack for unauthorized access. If key store 190 is compromised (e.g., vulnerability in key store, a rogue insider who has access to key store or Spectre/Meltdown attack), all the keys stored on key store 190 are susceptible, in turn making the data in data store 180 vulnerable. Accordingly, it is desirable that such a single point of attack be avoided.

Several aspects of the present disclosure, facilitates secured storage and usage of cryptography keys without having any single points of attack. For illustration, the manner in which server system 160A securely stores and uses the corresponding cryptography key according to aspects of the present disclosure is described below with examples. However, aspects of the present disclosure may be implemented in any digital processing system (such as other server systems 160 or end user systems 110) as will be apparent to one skilled in the relevant arts by reading the disclosure herein.

3. Facilitating Secured Storage and Usage of Cryptography Keys

Figure 2:
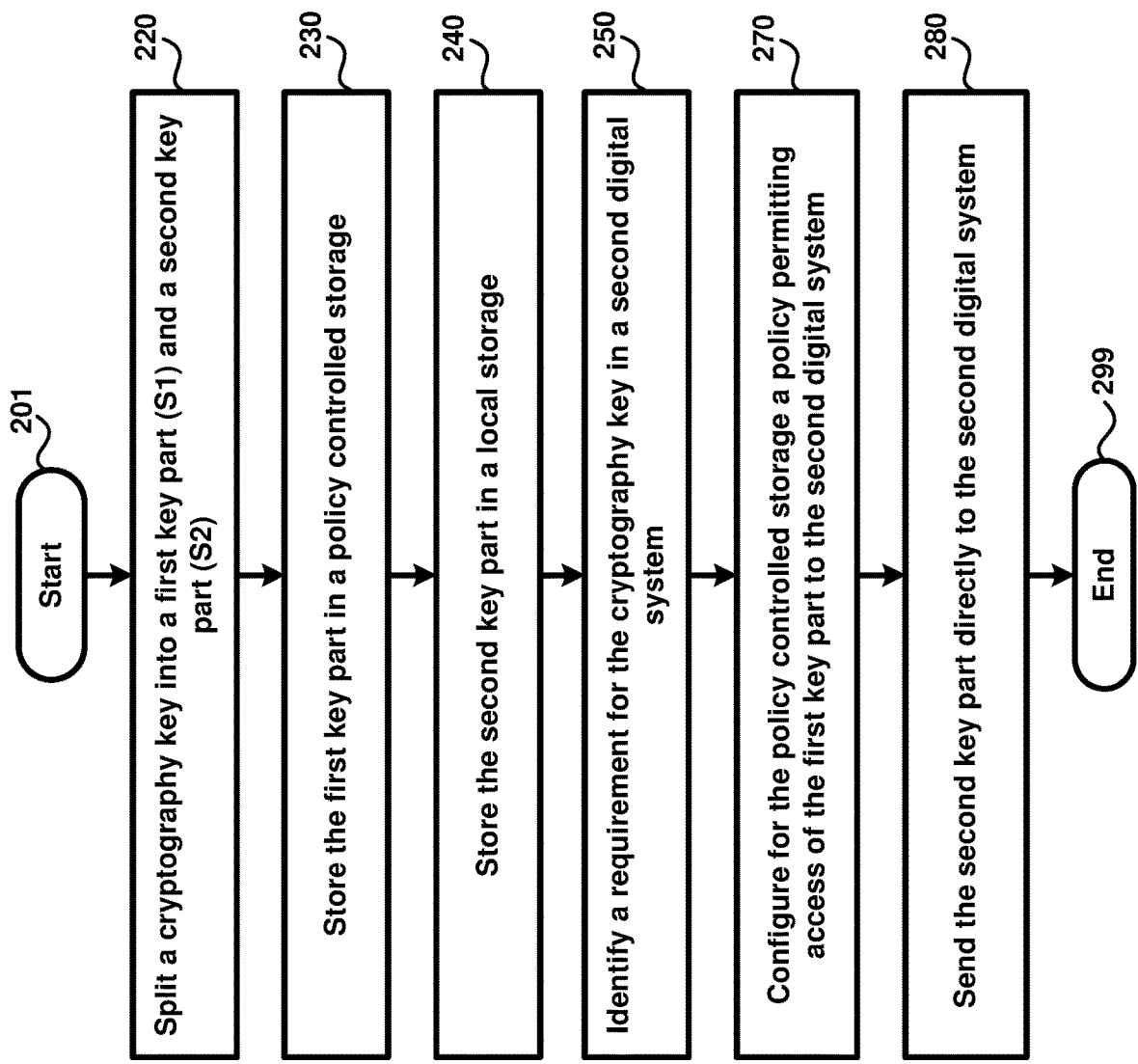
FIG. 2 is a flow chart illustrating the manner in which secured storage and usage of cryptography keys is facilitated according to aspects of the present disclosure.

FIG. 2 is a flow chart illustrating the manner in which secured storage and usage of cryptography keys is facilitated according to aspects of the present disclosure. The flowchart is described with respect to the systems of FIG. 1, in particular server systems 160A and 160B, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, server system 160A splits a cryptography key into a first key part (S1) and a second key part (S2). According to an aspect, the cryptography key is used for protection of a secret item (an item sought to be protected), where the cryptography key is a decryption key used for decrypting an encrypted form of the secret item.

In step 230, server system 160A stores the first key part (S1) in a policy-controlled storage (such as key store 190) which permits storage according to access policies. In one embodiment, S1 is stored according to a specific policy that restricts access to the first key part only to server system 160A.

It may be appreciated that the policy-controlled storage (key store 190) may store the first key part (and associated policy) in an insecure storage, e.g. a file system or a database without any loss of security. The only requirement is that key store 190 stores its private key securely. However, even if the private key is compromised, it may be appreciated that an unauthorized user (attacker) has access to only one part of the cryptography key and accordingly does not form a single point of attack.

In step 240, server system 160A stores the second key part (S2) in a local storage. The term "local" implies that the storage is directly or privately accessible only to the server system (160A). Thus, the local storage may be a hard-disk within or connected only to server system 160A or an external storage (e.g., repository such as Github™) designed to be accessed via server system 160A.

It should be noted that key store 190 does not have visibility to the secret item (sought to be protected), either in plaintext nor in encrypted form, and neither does key store 190 have access to the other share (S2). Thus, getting hold of S2 does not enable an attacker any access to the cryptography key, as the attacker still requires access to S1 which is only available on key store 190.

In step 250, a requirement in a second digital system (assumed to be server system 160B for illustration) for the cryptography key is identified. When the cryptography key is used for protection of a secret item, the requirement in the second digital system may be accessing of the secret item by server system 160B. In one embodiment, server system 160A receives an access request for the secret item or the cryptography key.

In step 270, server system 160A (in response to identifying the requirement) configures for the policy-controlled storage (key store 190) a first policy permitting access of the first key part (S1) to the second digital system (server system 160B). In the embodiment noted in step 230, server system 160A modifies the specific policy to a modified policy that permit access of the first key part to the second digital system.

In step 280, server system 160A (in response to identifying the requirement) sends the second key part (S2) directly to the second digital system (e.g. server system 160B). The second key part may be sent as a response to the access request, such that the second digital system is provided with all the key parts required for reconstructing the cryptography key. In particular, the second digital system (server system 160B) reconstructs the cryptography key by retrieving the first key part from the policy-controlled storage (key store 190) based on the first/modified policy and forming the cryptography key from the retrieved first key part and the second key part received from the first digital system. The flow chart ends in step 299.

While the embodiments herein are described with respect to splitting of a cryptography key into two parts, it may be appreciated that in alternative embodiments the cryptography key may be split into more parts. For example, a cryptography key may be split using Shamir's Secret Sharing technique (SSS technique). As is well known in the relevant arts, the SSS technique splits a key into many parts (N) for storing in different systems/storage, with the reconstruction of the key requiring only K of the N parts, with K being specified as an input to the splitting operation, wherein K and N are positive integers. In such a scenario (N−K+1) parts may be stored in the policy-controlled storage, such that the second digital system is forced to obtain the authorization for at least one of the K parts required for key reconstruction.

Thus, a first digital system (server system 160A) facilitates the secured storage and usage of cryptography keys according to several aspects of the present disclosure. As noted above, the cryptography key may be used for protection of secret items (which in turn may be a data item of interest or another cryptography key). The manner in which secret items may be protected according to several aspects of the present disclosure is described below with examples.

4. Protecting Secret Items

Figure 3A:
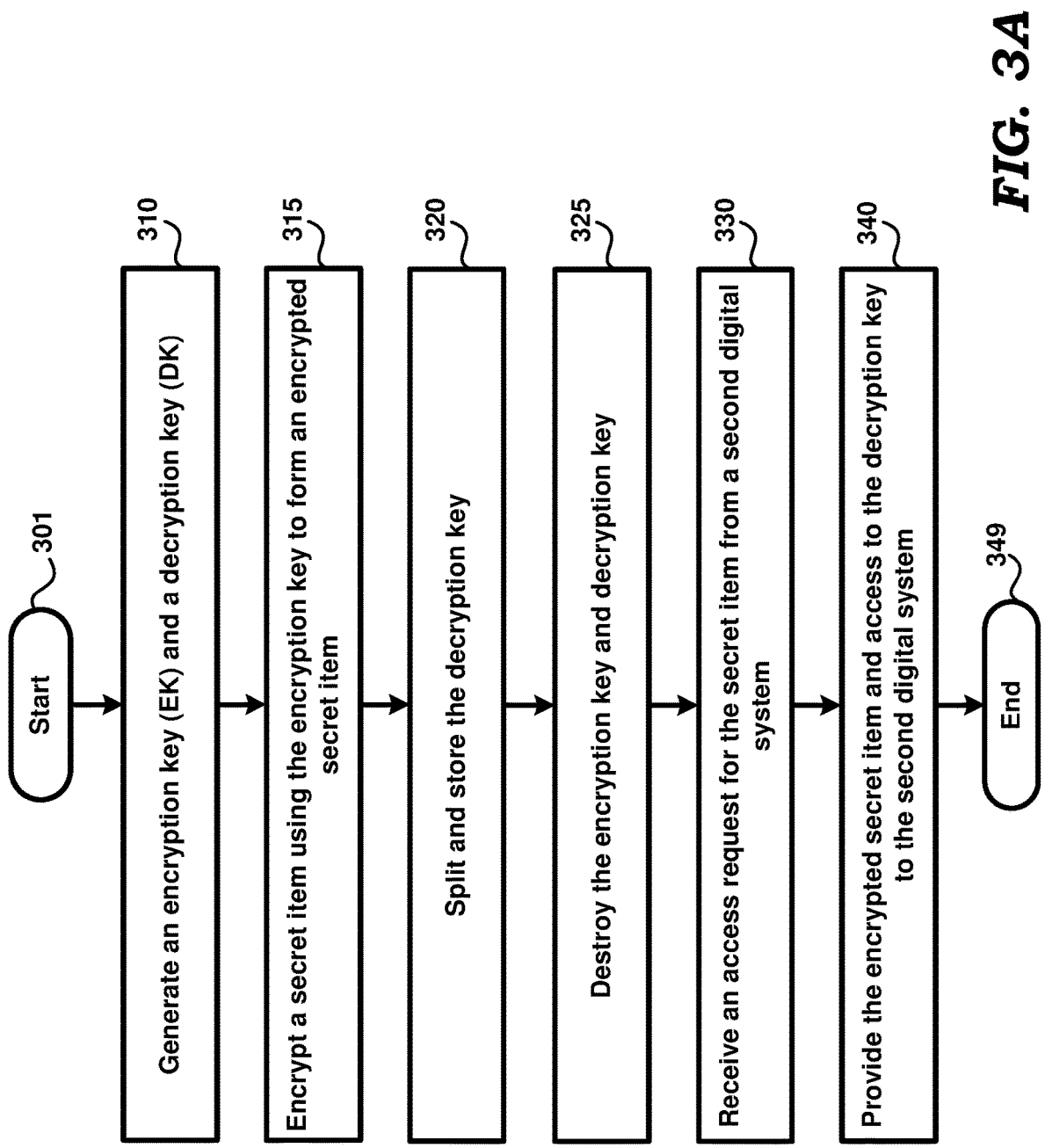
FIG. 3A is a flow chart illustrating the manner in which a secret item is protected in one embodiment.

FIG. 3A is a flow chart illustrating the manner in which a secret item is protected in one embodiment. The flowchart is described with respect to the systems of FIG. 1, in particular server systems 160A and 160B, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 310.

In step 310, server system 160A (a first digital system) generates (a unique combination of) an encryption key (EK) and a decryption key (DK) for encryption and decryption of a secret item sought to be protected. For example, and the EK and DK may be used by server system 160A to access data items stored in data store 180.

The combination of EK and DK may be generated using well known technologies such as PKI, RSA, etc. In one embodiment, the symmetric encryption technologies are used (in a known way) thereby making the encryption and decryption keys to be the same.

In step 315, server system 160A encrypts the secret item sought to be protected using the encryption key (EK) to form an encrypted secret item (encrypted form of the secret item). The encryption of the secret item may be performed in a known way, in conformance with the technology used for generation of the EK and DK. In general, the encryption ensures that the secret item can be accessed only by decrypting the encrypted secret item using the DK.

In step 320, server system 160A splits and stores the decryption key (DK) according to the actions 220, 230 and 240 of FIG. 2. It should be noted that the encrypted secret item is also stored in a local storage (e.g. along with the second key part).

In step 325, server system 160A destroys the decryption key thereby providing additional security for the secret item. Destroying implies that the decryption key in its whole form no longer exists in digital format. In case of symmetric encryption technologies, both encryption and decryption keys are destroyed.

In step 330, server system 160A receives an access request for the secret item from a second digital system (e.g. server system 160B). The access request may be received in view of the second digital system requiring access to the secret item (e.g. data item maintained in data store 180).

In step 340, server system 160A provides the encrypted secret item and access to the decryption key to the second digital system. In particular, server system 160A performs the actions of 270 and 280 of FIG. 2. In addition, server system 160A sends the encrypted secret item as part of the response to the access request, thereby enabling the second digital system to reconstruct the decryption key (DK) and then decrypting the encrypted secret item received in the response using the reconstructed decryption key. The flow chart ends in step 349.

Thus, a first digital processing system (server system 160A) securely protects a secret item according to several aspects of the present disclosure. The manner in which such protected secret items are accessed is described below with examples.

FIG. 3B is a flow chart illustrating the manner in which a protected secret item is accessed in one embodiment. The flowchart is described with respect to the systems of FIG. 1, in particular server systems 160B and 160A, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 351, in which control immediately passes to step 360.

In step 360, server system 160B (a second digital system) sends an access request for a secret item to a first digital system (server system 160A). The access request is sent to a first digital system that has securely stored the decryption key required for (decryption and) access to the protected secret item. As noted above, the secret item here is the cryptography key used by server system 160A for accessing data items maintained in data store 180.

In step 365, server system 160B receives a second key part (S2) of a decryption key and the encrypted secret item as a response to the access request from server system 160A. The response may be received after the first system (server system 160A) has added/modified any policies (in policy-controlled storage) controlling access to a first key part (S1) of the decryption key.

In step 370, server system 160B retrieves a first key part of the decryption key (S1) from a policy-controlled storage (such as key store 190) based on authorization provided by the first digital system (server system 160A). In one embodiment, server system 160B successfully authenticates itself to key store 190, which in turn checks if server system 160B is authorized to access the first key part stored in key store 190. If server system 160B is authorized (as it would be in view of the operation of steps 270 and 340 noted above), key store 190 decrypts S1 with its private key and provides S1 to server system 160B.

In step 380, server system 160B forms the decryption key (DK) from the retrieved first key part (S1) and the second key part (S2) received in the response in step 365. The forming of the DK may be performed consistent with the splitting of the DK into multiple parts as noted in step 220.

In step 390, server system 160B decrypts the encrypted secret item (received in the response in step 365) using the reconstructed decryption key to access the secret item (cryptography key used by server system 160A for accessing data maintained in data store 180). In one embodiment, server system 160B forms (e.g. recreates/recomputes) the DK using the S1 and S2 and decrypts the encrypted secret item in a volatile memory (e.g. RAM). In such an implementation, the secret item is only available in the memory (RAM) of server system 160B and never in key store 190. The flow chart ends in step 399.

Thus, a second digital processing system (server system 160B) is facilitated to access protected data items according to several aspects of the present disclosure. It may be appreciated that the that several aspects of the present disclosure according to the steps of FIGS. 3A and 3B may be implemented in different environments. An example use case is described below with examples.

5. Example Use Case

Figure 4:
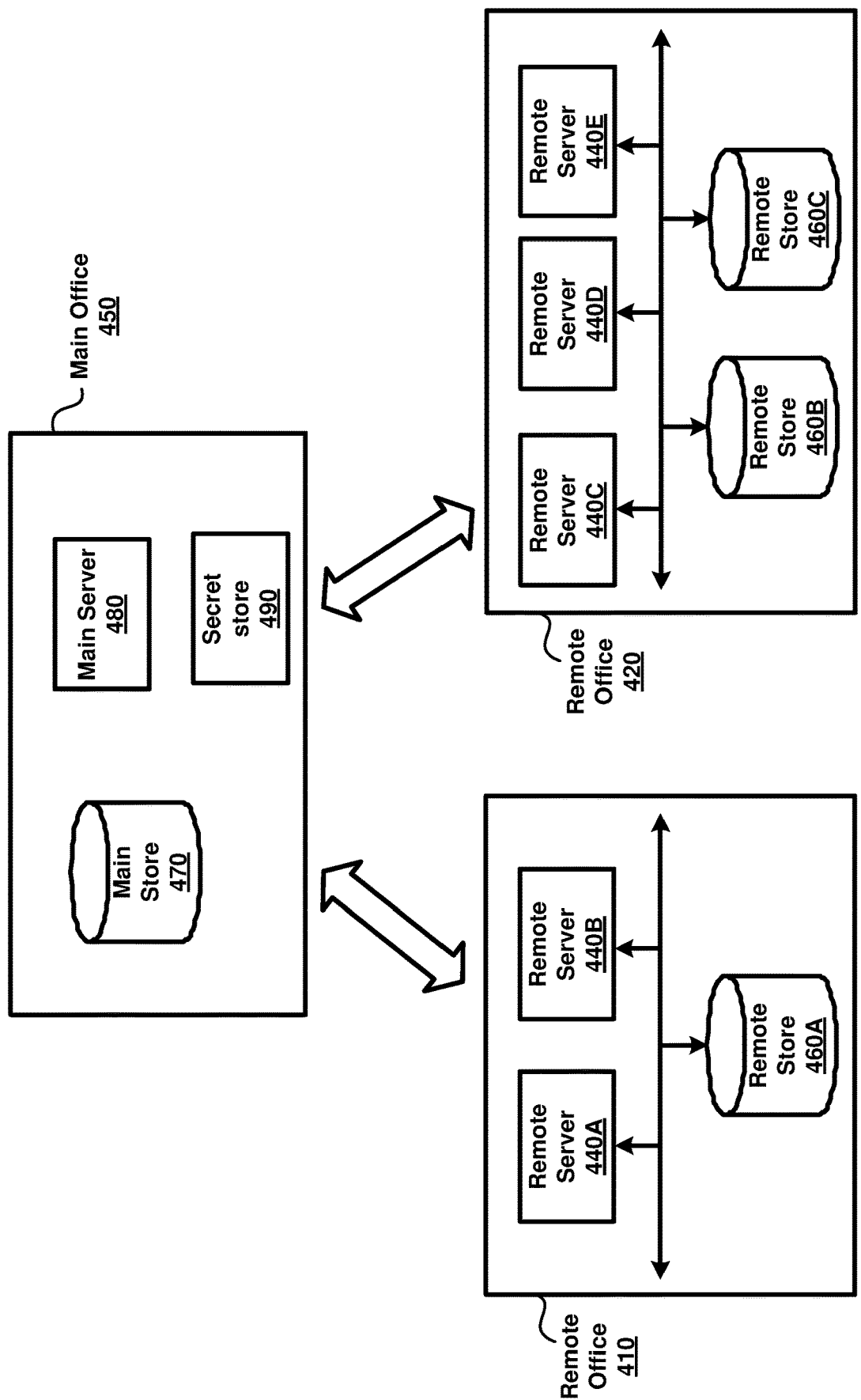
FIG. 4 is a block diagram illustrating an example use case for secured storage and usage of cryptography keys.

FIG. 4 is a block diagram illustrating an example use case for secured storage and usage of cryptography keys. In particular, the block diagram illustrates a remote office/branch office (ROBO) environment/organization containing two remote offices (also referred to as ROBO sites) 410 and 420 and main office 450 that are located in different (likely remote) geographical areas. For example, ROBO sites may be located in different cities, countries or continents. In addition to normal offices, ROBO sites may also be retail locations, insurance/sales offices, oil rigs, large manufacturing plants, etc.

Remote office 410 is showing containing remote servers 440A-440B and remote store 460A, while remote office 420 is showing containing remote servers 440C-440E and remote stores 460B-460C. Main office 450 is showing containing main store 470, main server 480 and key store 490. Remote servers 440A-440E and main server 480 are similar to server systems 160A-160C, remote stores 460A-460C and main store 470 are similar to data store 180 and key store 490 is similar to key store 190, and accordingly their description is not repeated here for conciseness.

ROBO clusters are storage clusters commonly used for data storage in such a ROBO environment/organization. As is well known, a storage cluster contains one or more storage servers (such as remote stores 460A-460C and main store 470) that work together to increase performance, capacity, or reliability. Clustering distributes workloads (data access requests) to each server, manages the transfer of workloads between servers, and provides access to all data from any server regardless of the physical location of the data.

However, there are several challenges to implementing ROBO clusters such as data protection, backup and disaster recovery, etc. in particular when the ROBO sites are unmanned (e.g. oil rigs noted above). In addition, ROBO clusters are more prone to physical theft than storage clusters located in a datacenter environment, since they are typically not located in a facility with adequate physical security. If the data stored in ROBO clusters is sensitive (such as those located in bank offices) then it must be protected using corresponding cryptography keys.

In one embodiment, each of remote servers 440A-440E accesses data maintained in a ROBO cluster using corresponding local keys. The local keys are then protected using a master key for the ROBO cluster. During operation, a remote server (such as 440A) retrieves the master key for a ROBO cluster, uses the master key to determine (by decryption) its local key and then uses the local key for accessing the data maintained in the ROBO cluster. Each remote server typically has different local keys when accessing data in different ROBO clusters, and accordingly each ROBO cluster is associated with a corresponding different master key.

In one prior approach, a master key for a ROBO cluster is split into multiple parts/shares, with the shares being stored within the multiple storages (e.g. disk drives) of the ROBO cluster. Such an approach resolves the issue of a single disk theft (since a disk has only a single share and more than 1 share is required to form the master key). However, an attacker may steal the box containing all the storages (disk drives) of the ROBO cluster and as such have all the shares of the master key (thereby becoming a single point of attack).

In another prior approach, the master keys of the different ROBO clusters are all stored in a central key repository (e.g. key store 490) located in a central data center/main office. The individual ROBO clusters connect to the central key manager and fetch the keys. Such an approach is more secure as node thefts at the ROBO sites do not yield the key. However, as the license costs of the central key repository increases with the number of keys to be stored/supported, using a central key repository is very expensive when the number of ROBO clusters/sites is very large (e.g. in the thousands). In addition, the central key repository becomes a single point of attack.

Aspects of the present disclosure are used to secure the master keys used for protection of other local keys, which are used to protect/access the data stored in corresponding ROBO clusters. The manner in which several aspects of the present disclosure are provided in the ROBO environment of FIG. 4 according to the steps of FIGS. 3A and 3B are illustrated below with examples.

6. Securing Master Keys

Broadly, the master key(s) are encrypted using a symmetric key (SK) which is split in 2 ways (using Shamir secret sharing). One share is stored on the ROBO cluster and the second share is sent securely and stored in a key store (490). Both shares are required to form the master key. The key store provides storage for the master key share, authenticates the ROBO cluster, provides authorization for any access to the stored shares and provides a mechanism to delete a share when the corresponding ROBO location is compromised.

Figure 5A:
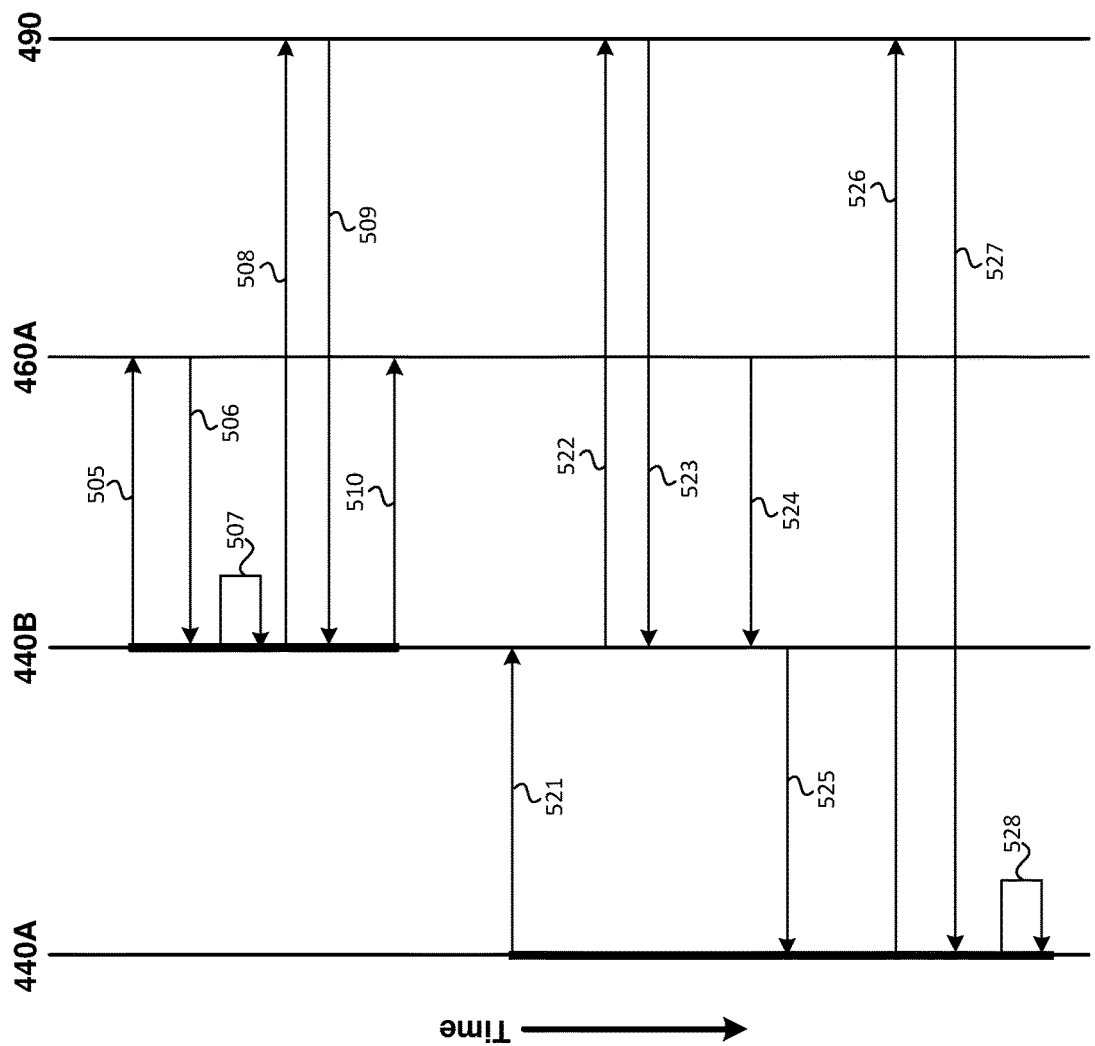
FIGS. 5A and 5B are sequence diagrams illustrating the manner in which secured storage and usage of master keys is provided in one embodiment.
Figure 5B:
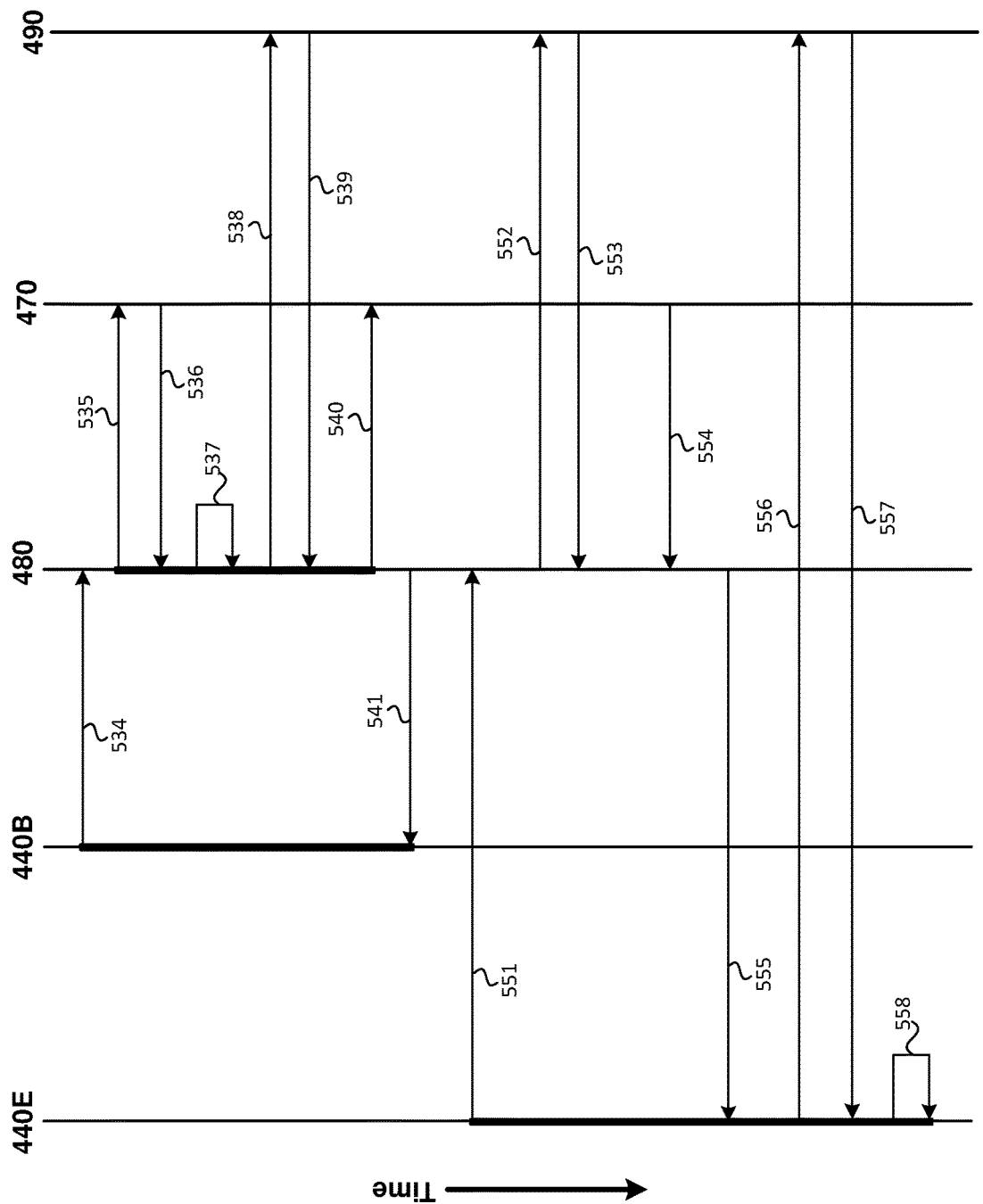

FIGS. 5A and 5B are sequence diagrams illustrating the manner in which secured storage and usage of master keys is provided in one embodiment. In the disclosure below, the first and second digital systems (one of remote servers 440A-440E and main server 480) are respectively referred to as 'Client1' and 'Client2', the secret item (master key) to be stored as 'Secret', the encryption key used to encrypt the secret item as 'EK', the decryption key used to decrypt the encrypted secret item as 'DK' and the shares/key parts of the decryption key as 'Share1' and 'Share2'. Moreover, it is assumed that key store 490 has a certificate (with the embedded public key) that is universally known (and hence available to all clients (remote servers 440A-440E and main server 480).

FIG. 5A illustrates the manner in which a first client (remote server 440B) provides access to a master key to a second client (remote server 440A) in the same office/ROBO site (here remote office 410). In particular, remote server 440B first retrieves the master key from a local storage such as remote store 460A (505 and 506), generates an EK and a DK (507).

Remote server 440B then splits the DK into two shares/parts (S1 and S2), encrypts the secret item using EK and creates two structures of the form:

```
Structure1 = {
    Id: <id to identity the secret>
    Share: <Share1 of DK encrypted using Key store's
    public key>
}
Structure2 = {
    Id: <id to identity the secret>
    Share: <Share2 of DK>
    Blob: <Secret encrypted using EK>
}
```

Remote server 440B (Client1) sends Structure1 to key store 490 (508, 509) and destroys DK (and optionally EK as well). By default, key store 490 creates an authorization policy that grants access to the Structure1 to the client that stored it (the owner). The Structure1 gets enhanced to:

```
Structure1 = {
    Id: <id to identity the secret>
    Share: <Share1 encrypted using Key store's public
    key>
    AuthZ: <Client1>
}
```

Remote server 440B (Client1) also stores Structure2 in its own store/local storage (510).

Upon receiving an access request from Client2 such as remote server system 440A (521), Client1 first configures/updates (522 and 523) the policy on key store 490 to grant access to Client2 (the Structure1 example above). The Structure1 gets enhanced to:

```
Structure1 - {
    Id: <id to identity the secret>
    Share: <Share1 encrypted using Key store's public
    key>
    AuthZ: <Client1, Client2>
}
```

Client1 then retrieves Structure2 from its own store (524) and sends Structure2 with/to Client2 (525), as key store 490 does not have access to the encrypted secret item or Share2. Client2 then authenticates itself to key store 490 and retrieves Structure1 noted above (526 and 527). It may be appreciated that key store 490 decrypts the Share1 with its private key and provides Share1 to Client2. Client2 then recreates (e.g. recomputes) the DK using the Share1 and Share2 in memory and decrypts the secret item that is the master key (528).

It should be noted that the entire workflow above is unique per secret item, hence different access policies can be created per secret item and the Structure2 may be stored in a storage of Client1's choice, and not in any central storage (again, avoiding any single point of attack).

FIG. 5B illustrates the manner in which a first client (remote server 440B) provides access to a master key to a second client (remote server 440E) in a different office/ROBO site (here remote office 420). In particular, remote server 440B sends the master key to main server 480 (534), which in turn performs the actions of splitting and storing the cryptography key used for protection of the master key (535 to 540 similar to 505 to 510 but with main store 470 operating as local storage) and sends a confirmation as a response (541).

The second client (remote server 440A) sends the access request to main server 480 (551), which in turn performs the configuration of key store 490 (552 and 553 similar to 522 and 523) and sending of Structure2 as a response to the request (554 and 555 similar to 524 and 525). The second client then accesses the master key by reconstructing the cryptography key and decrypting the encrypted secret item (556 to 558 similar to 526 to 528).

Thus, secured storage and usage of master keys is facilitated in ROBO clusters, without having any single point of attack. As one share is always stored in a central repository, an attacker stealing the box containing all the disk drives of a ROBO cluster will still not have all shares of the cryptography key (and as such will not be able to access the master key). In addition, as only one share of a master key is maintained in a central repository, the enterprise key manager needs to support only a limited/less number of keys and according the cost of usage of the central repository may be considerably reduced.

It should be further appreciated that the features described above can be implemented in various embodiments as a desired combination of one or more of hardware, software, and firmware. The description is continued with respect to an embodiment in which various features are operative when the software instructions described above are executed.

6. Digital Processing System

Figure 6:
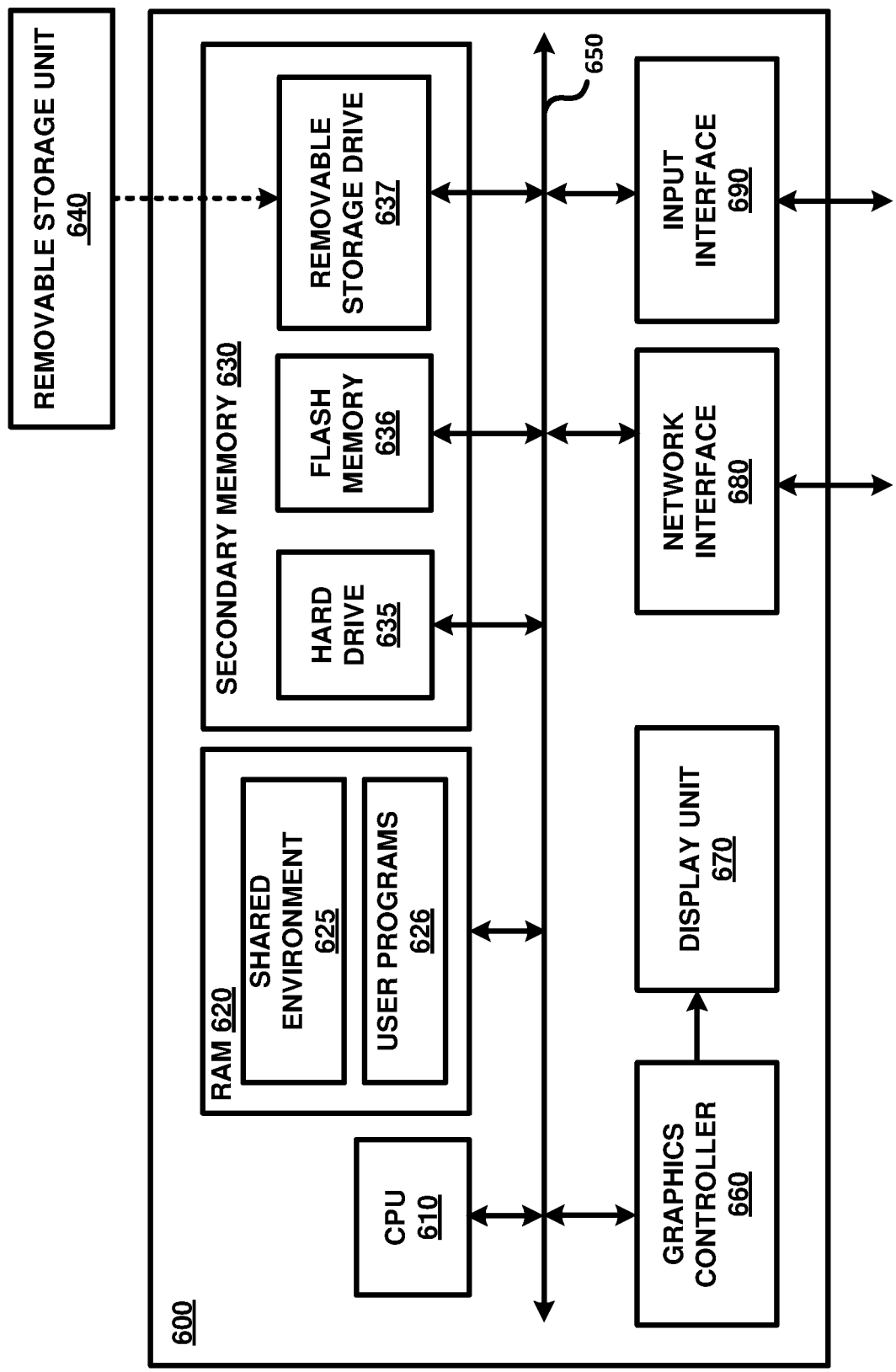
FIG. 6 is a block diagram illustrating the details of a digital processing system in which various aspects of the present disclosure are operative by execution of appropriate executable modules.

FIG. 6 is a block diagram illustrating the details of digital processing system 600 in which various aspects of the present disclosure are operative by execution of appropriate executable modules. Digital processing system 600 may correspond to any of server systems 160, end-user systems 110, remote servers 440A-440E and main server 480.

Digital processing system 600 may contain one or more processors such as a central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present disclosure. CPU 610 may contain multiple processing units, with each processing unit potentially being designed for a specific task. Alternatively, CPU 610 may contain only a single general-purpose processing unit.

RAM 620 may receive instructions from secondary memory 630 using communication path 650. RAM 620 is shown currently containing software instructions constituting shared environment 625 and/or other user programs 626 (such as other applications, DBMS, etc.). In addition to shared environment 625, RAM 620 may contain other software programs such as device drivers, virtual machines, etc., which provide a (common) run time environment for execution of other/user programs.

Graphics controller 660 generates display signals (e.g., in RGB format) to display unit 670 based on data/instructions received from CPU 610. Display unit 670 contains a display screen to display the images defined by the display signals. Input interface 690 may correspond to a keyboard and a pointing device (e.g., touch-pad, mouse) and may be used to provide inputs. Network interface 680 provides connectivity to a network (e.g., using Internet Protocol), and may be used to communicate with other systems (of FIG. 1) connected to the networks (120).

Secondary memory 630 may contain hard drive 635, flash memory 636, and removable storage drive 637. Secondary memory 630 may store the data (for example, data portions noted in the above sections) and software instructions (for example, for implementing the actions of FIGS. 2, 3A and 3B, 5A and 5B, etc.), which enable digital processing system 600 to provide several features in accordance with the present disclosure. The code/instructions stored in secondary memory 630 may either be copied to RAM 620 prior to execution by CPU 610 for higher execution speeds, or may be directly executed by CPU 610.

Some or all of the data and instructions may be provided on removable storage unit 640, and the data and instructions may be read and provided by removable storage drive 637 to CPU 610. Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 630. Volatile media includes dynamic memory, such as RAM 620. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 650. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A computer implemented method comprising:
   splitting a cryptography key into a first key part (S1) and a second key part (S2);
   storing said first key part in a policy-controlled storage which permits storage according to access policies;
   storing said second key part in a local storage of a first digital system;
   receiving in said first digital system, a request from a second digital system for said cryptography key said request being received at a first time instance;
   upon said receiving, after said first time instance, said first digital system performing the actions of:
      configuring for said policy-controlled storage a first policy permitting access of said first key part to said second digital system;
      sending said second key part directly to said second digital system, wherein said second digital system reconstructs said cryptography key by:
      retrieving said first key part from said policy-controlled storage based on said first policy,
      forming said cryptography key from said retrieved first key part and said second key part received from said first digital system,
   wherein each of said first digital system, said second digital system and said policy-controlled storage is provided as a respective separate system comprising a respective memory and a respective processor.

2. The method of claim 1, wherein said splitting is also performed by said first digital system and said second key part is stored in said local storage also by said first digital system,
   wherein said cryptography key is used for protection of a secret item,
   wherein said cryptography key is a decryption key used for decrypting an encrypted form of said secret item, and wherein said requirement is to access said secret item.

3. The method of claim 2, further comprising:
   generating an encryption key (EK) and said decryption key (DK);
   encrypting said secret item using said encryption key to create said encrypted form of said secret item, wherein said encrypted form of said secret item is stored in said local storage;
   destroying said encryption key and said decryption key; and
   receiving a request to said access said secret item from said second digital system,
   wherein said sending sends said second key part and said encrypted form of said secret item as a response to said request,
   wherein said second digital system reconstructs said decryption key and further performs the actions of decrypting said encrypted form of said secret item received in said response using said decryption key.

4. The method of claim 3, wherein said encryption key and said decryption key are the same.

5. The method of claim 2, wherein said secret item is a second cryptography key protected using said cryptography key.

6. The method of claim 5, wherein said second cryptography key is a master key used for protection of other local keys which in turn are used for protection of corresponding data of interest.

7. The method of claim 6, wherein said first digital system and said second digital system are systems of a Remote Office Branch Office (ROBO) cluster.

8. A non-transitory machine-readable medium storing one or more sequences of instructions, wherein execution of the one or more instructions by one or more processors contained in a first digital processing system causes the first digital processing system to perform the actions of:
   splitting a cryptography key into a first key part (S1) and a second key part (S2);
   storing said first key part in a policy-controlled storage which permits storage according to access policies;
   storing said second key part in a local storage of a first digital system;
   receiving in said first digital system, a request from a second digital system for said cryptography key said request being received at a first time instance;
   upon said receiving, after said first time instance, said first digital system performing the actions of:
      configuring for said policy-controlled storage a first policy permitting access of said first key part to said second digital system;
      sending said second key part directly to said second digital system, wherein said second digital system reconstructs said cryptography key by:
      retrieving said first key part from said policy-controlled storage based on said first policy,
      forming said cryptography key from said retrieved first key part and said second key part received from said first digital system.

9. The non-transitory machine-readable medium of claim 8, wherein said splitting is also performed by said first digital system and said second key part is stored in said local storage also by said first digital system,
   wherein said cryptography key is used for protection of a secret item, wherein said cryptography key is a decryption key used for decrypting an encrypted form of said secret item, and wherein said requirement is to access said secret item.

10. The non-transitory machine-readable medium of claim 9, further comprising one or more instructions for:

generating an encryption key (EK) and said decryption key (DK);

encrypting said secret item using said encryption key to create said encrypted form of said secret item, wherein said encrypted form of said secret item is stored in said local storage;

destroying said encryption key and said decryption key; and receiving a request to said access said secret item from said second digital system, wherein said sending sends said second key part and said encrypted form of said secret item as a response to said request, wherein said second digital system reconstructs said decryption key and further performs the actions of decrypting said encrypted form of said secret item received in said response using said decryption key.

11. The non-transitory machine-readable medium of claim 10, wherein said encryption key and said decryption key are the same.

12. The non-transitory machine-readable medium of claim 9, wherein said secret item is a second cryptography key protected using said cryptography key.

13. The non-transitory machine-readable medium of claim 12, wherein said second cryptography key is a master key used for protection of other local keys which in turn are used for protection of corresponding data of interest.

14. The non-transitory machine-readable medium of claim 13, wherein said first digital system and said second digital system are systems of a Remote Office Branch Office (ROBO) cluster.

15. A first digital system comprising:

a random access memory (RAM) to store instructions; and one or more processors to retrieve and execute the instructions, wherein execution of the instructions causes the first digital system to perform the actions of:

splitting a cryptography key into a first key part (S1) and a second key part (S2);

storing said first key part in a policy-controlled storage which permits storage according to access policies;

storing said second key part in a local storage of a first digital system;

receiving in said first digital system, a request from a second digital system for said cryptography key said request being received at a first time instance;

upon said receiving, after said first time instance, said first digital system performing the actions of:

configuring for said policy-controlled storage a first policy permitting access of said first key part to said second digital system;

sending said second key part directly to said second digital system, wherein said second digital system reconstructs said cryptography key by:

retrieving said first key part from said policy-controlled storage based on said first policy, forming said cryptography key from said retrieved first key part and said second key part received from said first digital system.

16. The first digital system of claim 15, wherein said splitting is also performed by said first digital system and said second key part is stored in said local storage also by said first digital system, wherein said cryptography key is used for protection of a secret item, wherein said cryptography key is a decryption key used for decrypting an encrypted form of said secret item, and wherein said requirement is to access said secret item.

17. The first digital system of claim 16, further performing the actions of:

generating an encryption key (EK) and said decryption key (DK);

encrypting said secret item using said encryption key to create said encrypted form of said secret item, wherein said encrypted form of said secret item is stored in said local storage;

destroying said encryption key and said decryption key; and receiving a request to said access said secret item from said second digital system, wherein said sending sends said second key part and said encrypted form of said secret item as a response to said request, wherein said second digital system reconstructs said decryption key and further performs the actions of decrypting said encrypted form of said secret item received in said response using said decryption key.

18. The first digital system of claim 16, wherein said secret item is a second cryptography key protected using said cryptography key.

19. The first digital system of claim 18, wherein said second cryptography key is a master key used for protection of other local keys which in turn are used for protection of corresponding data of interest.

20. The first digital system of claim 19, wherein said first digital system and said second digital system are systems of a Remote Office Branch Office (ROBO) cluster.

* * * * *